(12) United States Patent
Liu et al.

(10) Patent No.: US 8,204,209 B2
(45) Date of Patent: Jun. 19, 2012

(54) FULL DUPLEX HANDS-FREE TELEPHONE SYSTEM

(75) Inventors: Qing-Guang Liu, Sunnyvale, CA (US); Wilson Or, Belmont, CA (US); Long Tran, Milpitas, CA (US); Victor Mei, Palo Alto, CA (US)

(73) Assignees: Fortemedia, Inc., Sunnyvale, CA (US); Maxsonics, Inc., Santa Clara, CA (US)

( * ) Notice: Subject to any disclaimer, the term of this patent is extended or adjusted under 35 U.S.C. 154(b) by 1139 days.

(21) Appl. No.: 12/044,054

(22) Filed: Mar. 7, 2008

(65) Prior Publication Data
US 2008/0219433 A1 Sep. 11, 2008

Related U.S. Application Data

(60) Provisional application No. 60/906,134, filed on Mar. 9, 2007.

(51) Int. Cl.
*H04M 9/08* (2006.01)
(52) U.S. Cl. ................................. 379/406.06
(58) Field of Classification Search ............... 379/406.06
See application file for complete search history.

(56) References Cited

U.S. PATENT DOCUMENTS

| | | | |
|---|---|---|---|
| 6,377,679 B1 | 4/2002 | Hashimoto et al. | |
| 6,643,364 B1 | 11/2003 | Takahashi | |
| 6,745,055 B1 | 6/2004 | Iyengar et al. | |
| 2003/0026244 A1* | 2/2003 | Pietrowicz et al. | 370/352 |
| 2005/0063533 A1 | 3/2005 | Dettmer | |
| 2005/0078690 A1* | 4/2005 | DeLangis | 370/401 |

OTHER PUBLICATIONS

PCT Written Opinion mailed Jun. 30, 2008.

* cited by examiner

*Primary Examiner* — Alexander Jamal
(74) *Attorney, Agent, or Firm* — Thomas|Kayden

(57) ABSTRACT

A telephone system comprising an analog telephone and a full-duplex speakerphone adapter is disclosed. The analog telephone comprises an ordinary analog telephone subscriber circuit for transmitting and receiving analog signals and a handset for users. The full-duplex speakerphone adapter is coupled between the analog telephone and a central office, uses a subscriber loop interface circuit through the first telephone line to couple to the ordinary analog telephone subscriber circuit of the analog telephone and uses a telephone hybrid interface circuit through the second telephone line to couple to a wall jack to communicate with the central office.

12 Claims, 7 Drawing Sheets

FULL DUPLEX HANDS-FREE TELEPHONE SYSTEM

CROSS REFERENCE TO RELATED APPLICATIONS

This application claims the benefit of U.S. Provisional Application No. 60/906,134, filed on Mar. 9, 2007.

BACKGROUND OF THE INVENTION

1. Field of the Invention

The invention relates to a hand free telephone system, and in particular relates to a telephone system with an ordinary analog telephone and a full-duplex speakerphone adapter.

2. Description of the Related Art

Hands-free speakerphone usages have become a common and important part of business conferences and daily telecommunications. Demand for good voice quality to facilitate efficient communications have increased, and the full-duplex feature for hands-free speakerphones has become highly desirable for business and home communications.

Conventionally, the most common speakerphones offer the ability to converse either in a handset mode or hands-free mode. FIG. 1A shows a conventional speakerphone 100 with a handset 72, a microphone 50 and a loudspeaker 51. A switch 191 on the speakerphone 100 determines whether the speakerphone 100 operates in the handset mode or hands-free mode. In the hands-free mode, users can be at a distance away from the speakerphone 100. The loudspeaker 51 conducts a telephone conversation without users holding the handset 72. Hands-free mode allows multiple participants to join the conversation in an audio-conference meeting, and also allows users to free up their hands for operating computer keyboards or other activities. FIG. 1B shows a conventional speakerphone 101 without a handset. In recent years, speakerphones 101 without handsets have become common, operating only in hands-free mode.

BRIEF SUMMARY OF THE INVENTION

A detailed description is given in the following embodiments with reference to the accompanying drawings.

An embodiment of telephone system is provided. The telephone system comprises an analog telephone and a full-duplex speakerphone adapter. The analog telephone comprises an ordinary analog telephone subscriber circuit for transmitting and receiving analog signals and a handset for users. The full-duplex speakerphone adapter is coupled in between the analog telephone and a central office, uses a subscriber loop interface circuit through a first telephone line to couple to the ordinary analog telephone subscriber circuit of the analog telephone and uses a telephone hybrid interface circuit through a second telephone line to couple to a wall jack to communicate with the central office.

Another embodiment of a full-duplex speakerphone adapter is provided. The full-duplex speakerphone adapter comprises a subscriber loop interface circuit, a telephone hybrid interface circuit, and a telephone signal processing unit. The subscriber loop interface circuit through a first telephone line is coupled to an ordinary analog telephone subscriber circuit of an analog telephone. The telephone hybrid interface circuit through a second telephone line is coupled to a wall jack to communicate with a central office. The telephone signal processing unit processes digital signals to remove line echo and acoustic echo. The full-duplex speakerphone adapter can be switched to a hands-free speakerphone mode or an ordinary analog telephone mode.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
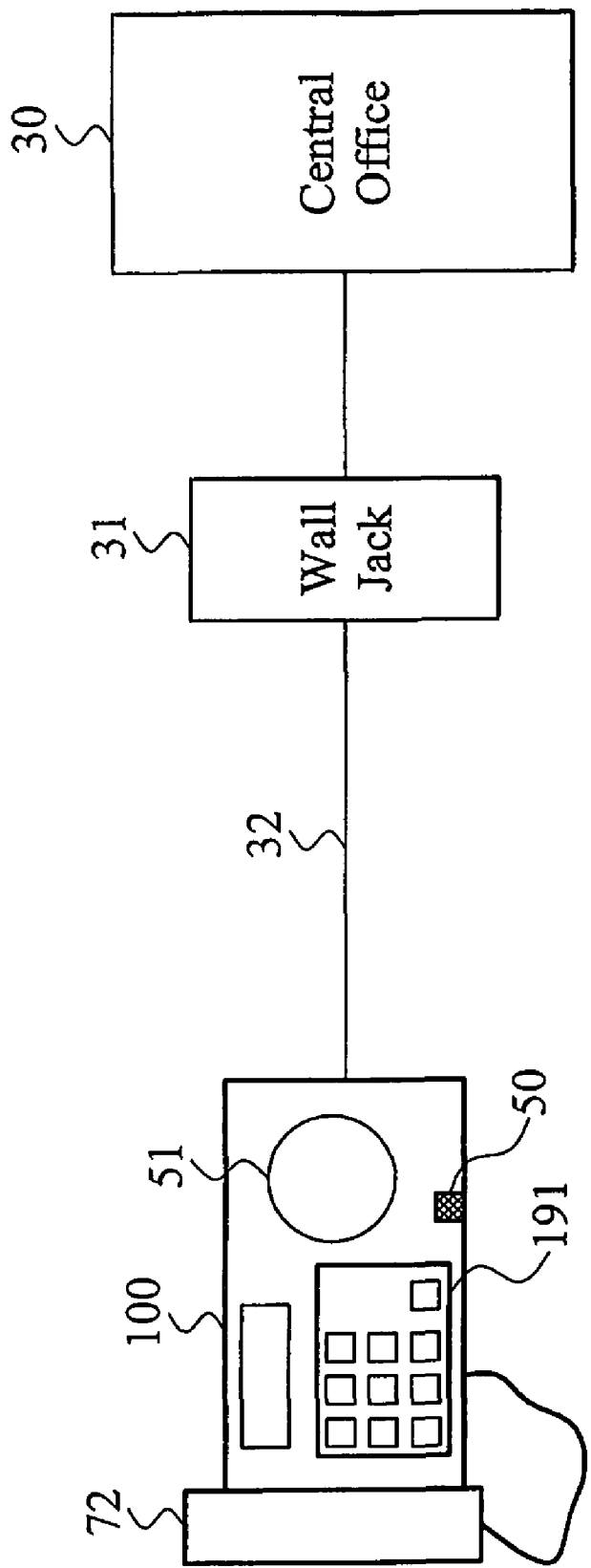
FIG. 1A shows a conventional speakerphone with a handset.
Figure 1B:
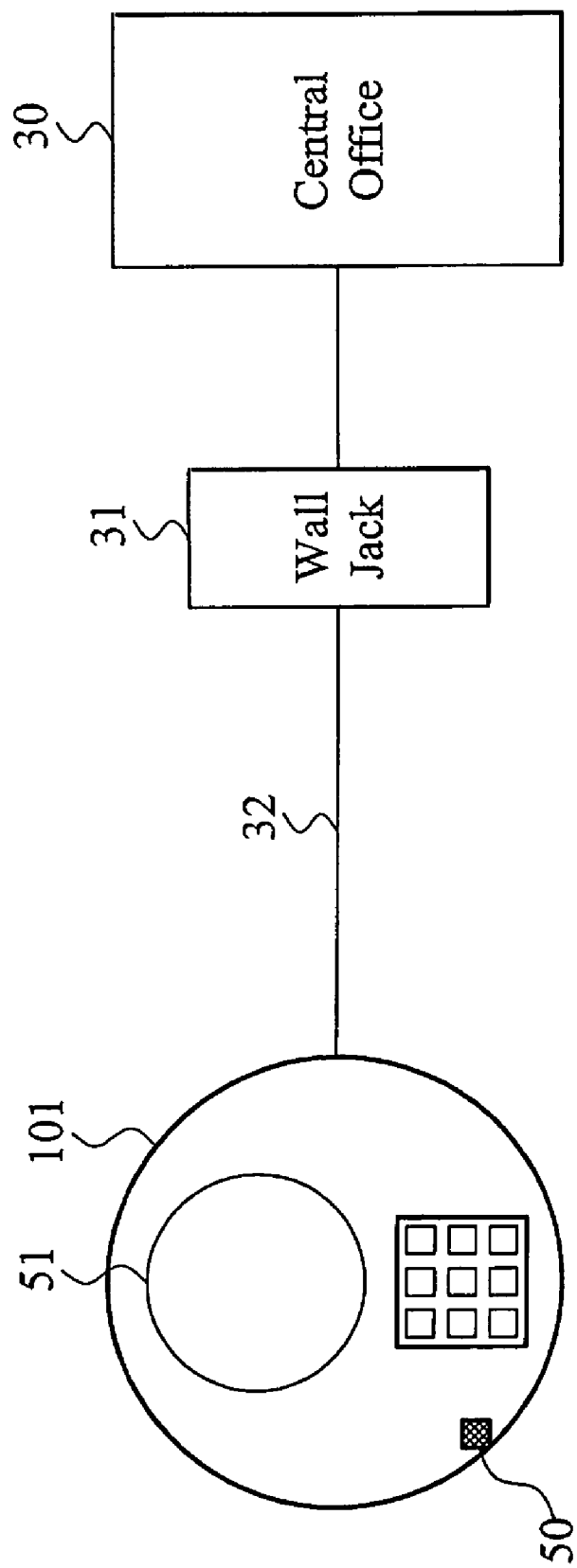
FIG. 1B shows a conventional speakerphone without a handset.
Figure 2:
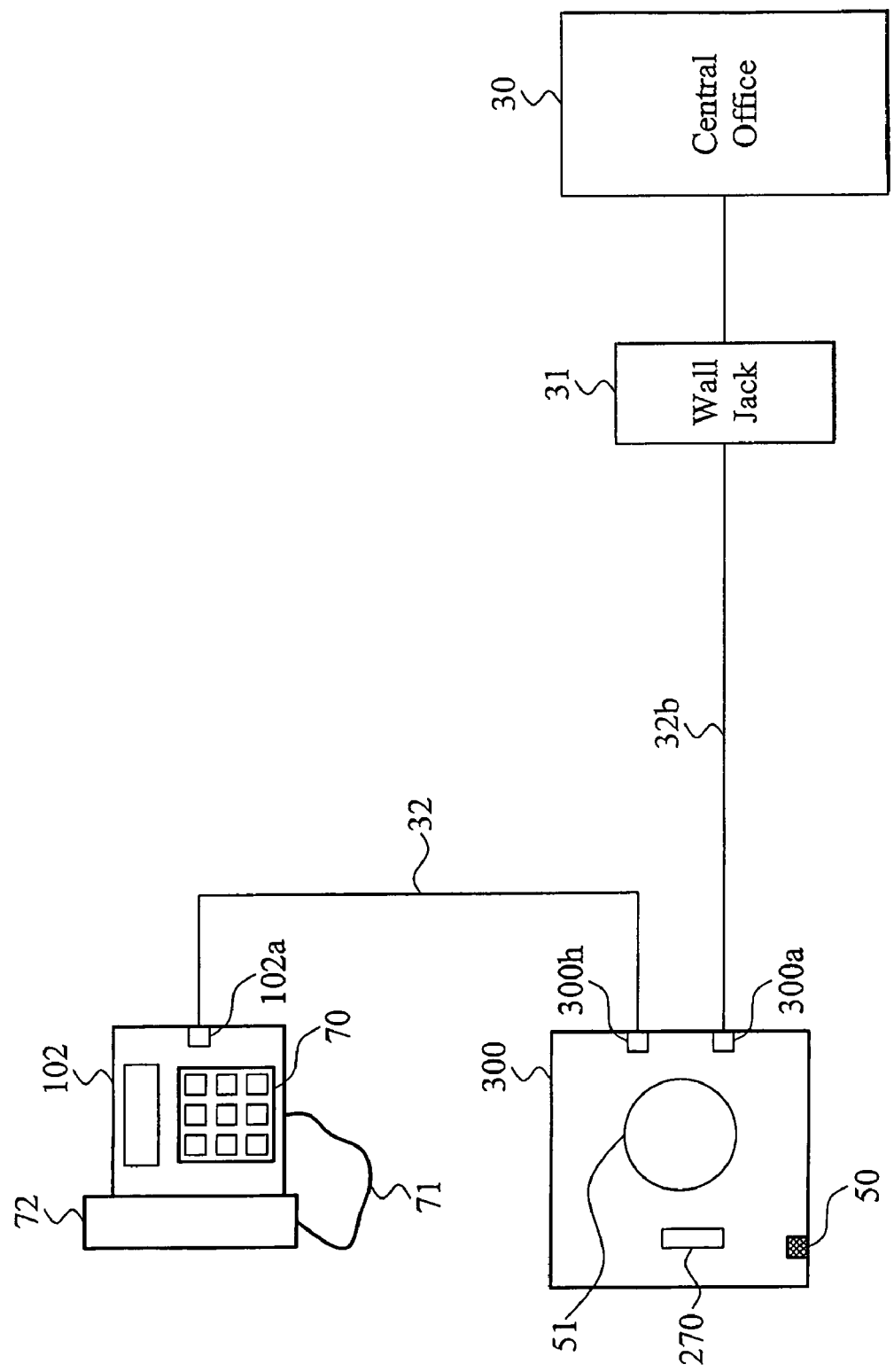
FIG. 2 shows a full-duplex speakerphone adapter connected to an ordinary analog telephone according to an embodiment of the invention.

FIG. 2 shows a full-duplex speakerphone adapter 300 connected to an ordinary analog telephone 102 according to an embodiment of the invention. As shown in FIG. 2, the ordinary analog telephone 102 does not directly connect to a wall jack 31. The ordinary analog telephone 102 uses a telephone line 32 to plug into the telephone line jack 300h of the full-duplex speakerphone adapter 300. The full-duplex speakerphone adapter 300 is connected to the wall jack 31 through another telephone line 32b, and hence outwards to a telephone central office 30.

The full-duplex speakerphone adapter 300 is responsible for providing the proper impedance on the telephone line 32b, both during an on-hook condition and an off-hook condition. The full-duplex speakerphone adapter 300 is also responsible for providing the proper impedance and line voltages on the telephone line 32, both during the on-hook condition and during the off-hook condition, such that the ordinary analog telephone 102 that plugs into the telephone line jack 300h performs as if it is connected to the telephone wall jack 31 interfacing with an ordinary analog telephone subscriber circuit.

During the normal telephone on-hook and idle condition, the full-duplex speakerphone adapter 300 interfaces with the telephone line 32b in an on-hook condition.

During an inbound call, the full-duplex speakerphone adapter 300 detects the ring condition the telephone line 32b by using a telephone hybrid interface circuit 130, and, using the subscriber loop interface circuit 132 to provide the ring generation to the telephone line 32 to ring the ordinary analog telephone 102. As the user takes the ordinary analog telephone 102 off hook, the full-duplex speakerphone adapter 300 establishes a relay data signal path between the telephone line 32b and the telephone line 32 such that voice data path is established between the ordinary analog telephone 102 and the wall jack 31. The user can use the switch 270 to switch the full-duplex speakerphone adapter 300 to a hands-free speakerphone mode for hands-free conversation.

During an outbound call, the user takes the ordinary analog telephone 102 off hook. The subscriber loop interface circuit 132 on the full-duplex speakerphone adapter 300 detects the off-hook condition of the analog telephone 102 and puts the telephone line 32b which is coupled to the telephone hybrid interface circuit 130 to an off-hook condition, and then establishes a relay data signal path between the telephone line 32b and the telephone line 32 such that voice data path is established between the ordinary analog telephone 102 and the wall jack 31. The dial tone from the central office 30 comes to the wall jack 31 and is relayed to the ordinary analog telephone 102. The user can dial the outbound digits on the ordinary analog telephone 102. Once the dialing is completed, the user can use the switch 270 to switch the full-duplex speakerphone adapter 300 to a hands-free speakerphone mode for hands-free conversation.

Figure 3A:
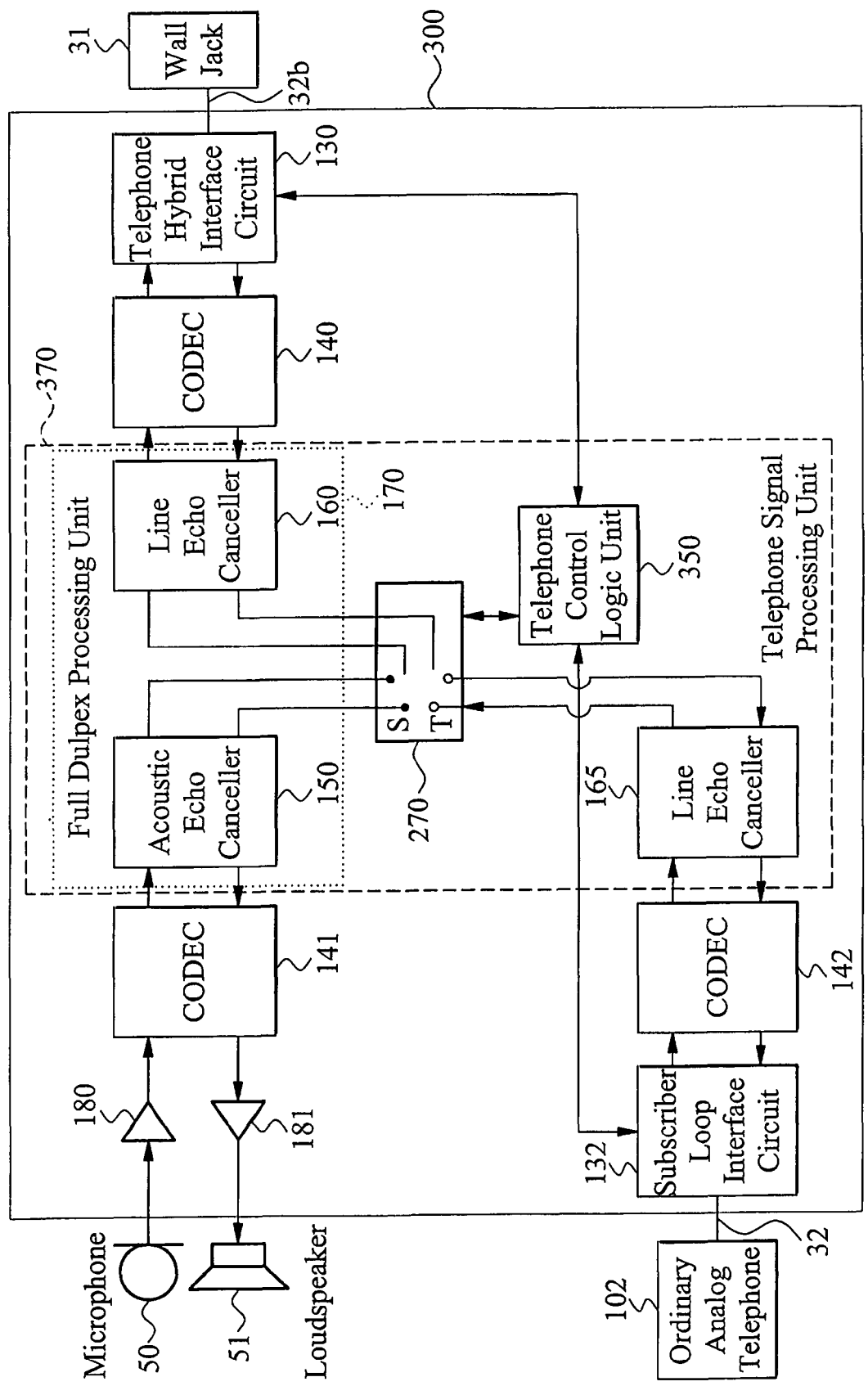
FIG. 3A shows a block diagram of the full-duplex speakerphone as shown in FIG. 2 according to another embodiment of the invention.

FIG. 3A shows a block diagram of the full-duplex speakerphone 300 as shown in FIG. 2 according to another embodiment of the invention. The full-duplex speakerphone adapter 300 comprises a telephone hybrid interface circuit 130 through the telephone line 32b to connect to the wall jack 31. The telephone hybrid interface circuit 130 can be controlled by the telephone control logic unit 350 to switch to an off-hook condition or to an on-hook condition. The telephone hybrid interface circuit 130 can also detect the ring phone condition generated by the central office 30 and notify the telephone control logic unit 350.

The full-duplex speakerphone adapter 300 also comprises a subscriber loop interface circuit 132 which provides the proper impedance and line voltage on the telephone line 32 to the ordinary analog telephone 102, both during the on-hook condition and during the off-hook condition. The ordinary analog telephone 102 that plugs into the telephone line jack 300h performs as if it is connected onto the telephone wall jack 31 interfacing with an ordinary analog telephone subscriber circuit (not shown in FIG. 3A). The subscriber loop interface circuit 132 can generate proper ring voltage and frequency and is controlled by the telephone control logic unit 350 to ring the ordinary analog telephone 102. The subscriber loop interface circuit 132 also comprises the on-hook and off-hook detection circuit (not shown in FIG. 3A) to detect the hook condition of the ordinary analog telephone 102 through the telephone line 32.

During an inbound call, the telephone hybrid interface circuit 130 detects the ring condition on the telephone line 32b, and notifies the telephone control logic unit 350, which in turn controls the ring generation on the subscriber loop interface circuit 132 to ring the ordinary analog telephone 102 through the telephone line 32. As the user takes the ordinary analog telephone 102 off hook, the subscriber loop interface circuit 132 detects the off-hook condition and notifies the telephone control logic unit 350. The telephone control logic unit 350 then establishes a relay data signal path between the telephone line 32b and the telephone line 32 such that the ordinary analog telephone 102 is virtually connected to the wall jack 31. Then, users can use the switch 270 to switch the full-duplex speakerphone adapter 300 to the hands-free speakerphone mode for hands-free conversation.

During an outbound call, the user takes the ordinary analog telephone 102 off hook. The hybrid interface circuit 130 detects the off-hook condition of the analog telephone 102 and notifies the telephone control logic unit 350, which in turn controls the hybrid interface circuit 130 to enter into an off-hook condition on the telephone line 32b. The telephone control logic unit 350 then establishes a relay data signal path between the telephone line 32b and the telephone line 32 such that the ordinary analog telephone 102 is virtually connected to the wall jack 31. The dial tone from the central office 30 comes to the wall jack 31 and is relayed to the ordinary analog telephone 102. Users can dial the outbound digits on the ordinary analog telephone 102. Once dialing is completed, users can use the switch 270 to switch the full-duplex speakerphone adapter 300 to the hands-free speakerphone mode for hands-free conversation. The switch 270 comprises two switching positions S and T respectively for a hands-free speakerphone mode and an ordinary analog telephone mode.

As shown in FIG. 3A, the telephone signal processing unit 370 comprises a full-duplex processing unit 170, a telephone control logic unit 350, a line echo canceller 165 and the switch 270. The telephone signal processing unit 370 can process signal data in digital domain. The telephone signal processing unit 370 can be implemented entirely in hardware, but is typically implemented as algorithms and control software running on a digital programmable processor. The programmable processor can also execute additional telephone signal processing algorithms or user interface controls. The processor itself could be a digital signal processor (DSP) device, a reduced instruction set computer (RISC) device, or any other programmable processing device capable of handling the tasks.

Figure 3B:
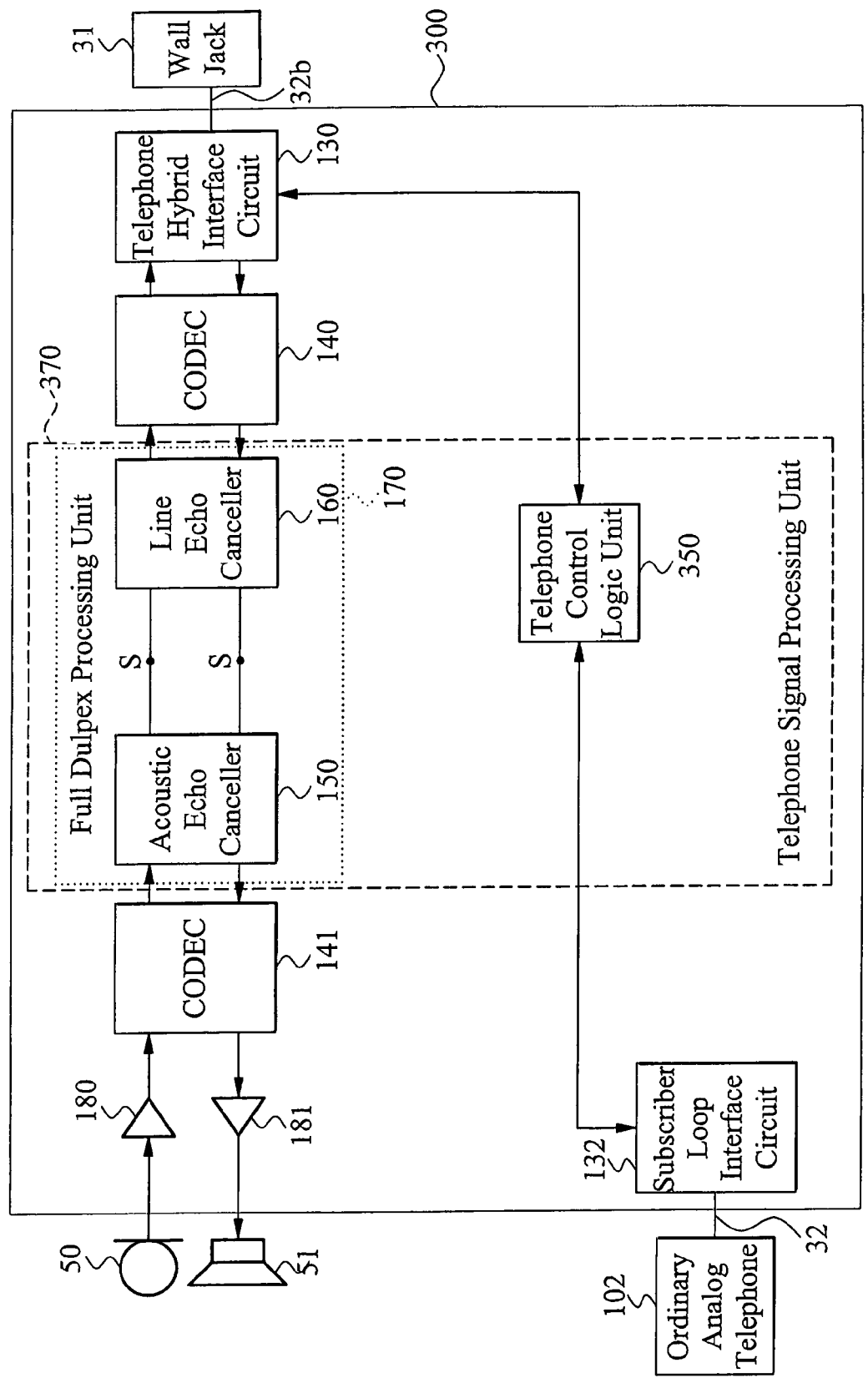
FIG. 3B shows a block diagram of the effective data path inside the full-duplex speakerphone adapter when the switch switches to the position S for hands-free speakerphone mode according to another embodiment of the invention.

FIG. 3B shows a block diagram of the effective data path inside the full-duplex speakerphone adapter 300 when the switch 270 switches to the position S for a hands-free speakerphone mode according to another embodiment of the invention. The voice data flows between the telephone hybrid interface circuit 130 and the microphone 50 and loudspeaker 51. The user speech signal is picked up by the microphone 50 and then amplified by a pre-amplifier 180 before going into an analog input of the CODEC 141. The CODEC 141 outputs audio signals from its analog output to the amplifier 181 that drives the loudspeaker 51 to produce a loud enough audio for the hands-free speakerphone mode. When the switch 270 switches to the hands-free speakerphone mode, the full-duplex speakerphone adapter 300 functions as a full-duplex speakerphone connected through the telephone line 32b to the wall jack 31.

Noted that the digital signal path is established inside of the full-duplex processing unit 170 and the analog signal path is established outside of the full-duplex processing unit 170. The full-duplex processing unit 170 comprises a line echo canceller 160 and an acoustic echo canceller 150. The acoustic echo canceller 150 receives/transmits digital signals from/to the CODEC 141 and the line echo canceller 160. The line echo canceller 160 also receives/transmits digital signals from/to the acoustic echo canceller 150 and the CODEC 140. The line echo canceller 160 can remove line echo from the telephone hybrid interface circuit 130. The acoustic echo canceller 150 removes acoustic echo from a loop through a loudspeaker 51 and a microphone 50.

Figure 3C:
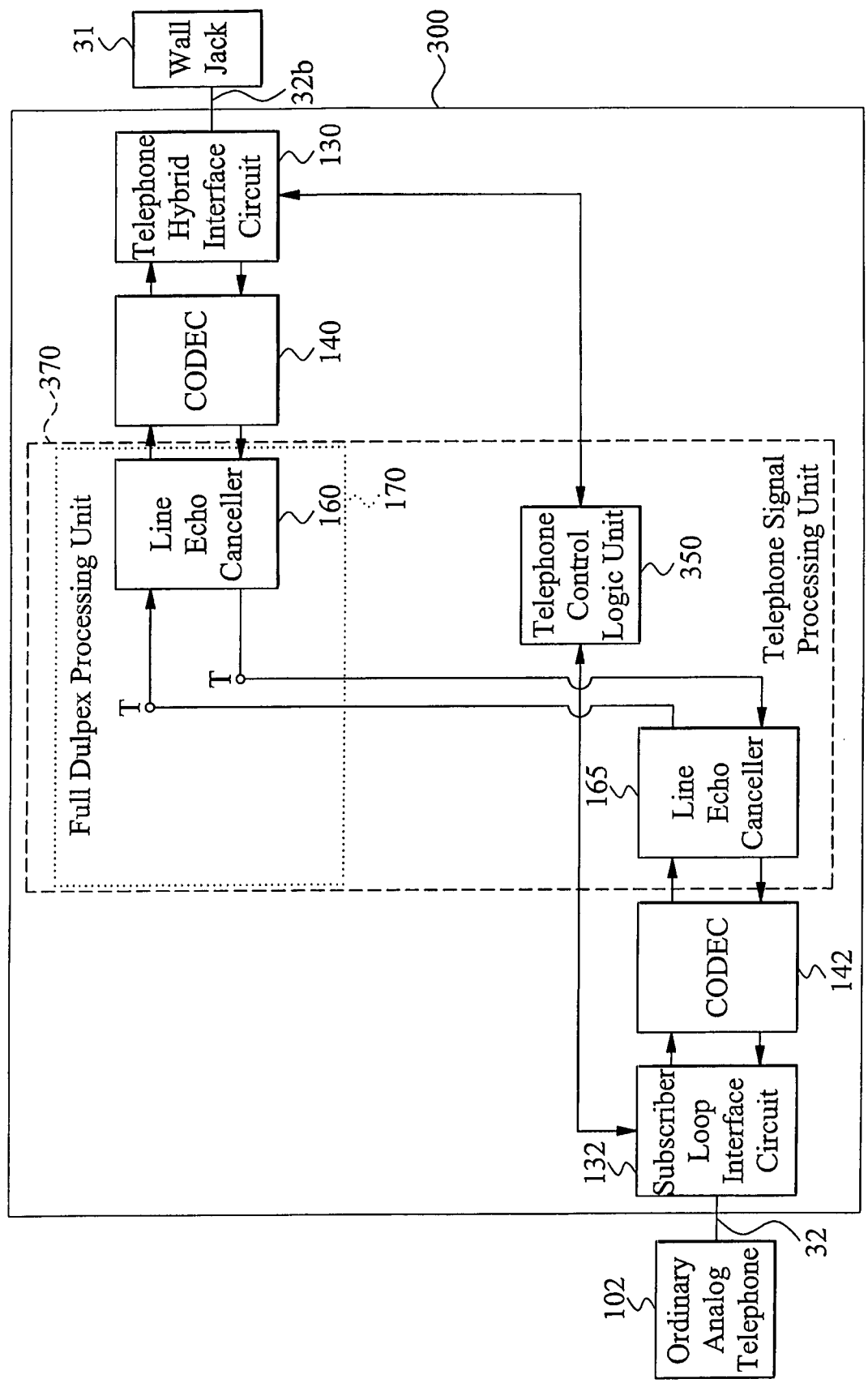
FIG. 3C shows a block diagram of the effective data path inside the full-duplex speakerphone adapter when the switch switches to the position T for ordinary analog telephone mode according to another embodiment of the invention.

FIG. 3C shows a block diagram of the effective data path inside the full-duplex speakerphone adapter 300 when the switch 270 switches to the position T for ordinary analog telephone mode according to another embodiment of the invention. The voice data flows between the telephone hybrid interface circuit 130 and the subscriber loop interface circuit 132. The full-duplex speakerphone adapter 300 acts as a data path relay between the ordinary analog telephone 102 to the wall jack 31.

The line echo canceller 160 removes line echo at the telephone hybrid interface circuit 130 and is coupled to the line echo canceller 165. The line echo canceller 165 can attenuate line echo return signals generated at the subscriber loop interface circuit 132 which is coupled to the ordinary analog telephone 102 such that the line echo can not be transmitted to and heard by the far-end talker.

Figure 4:
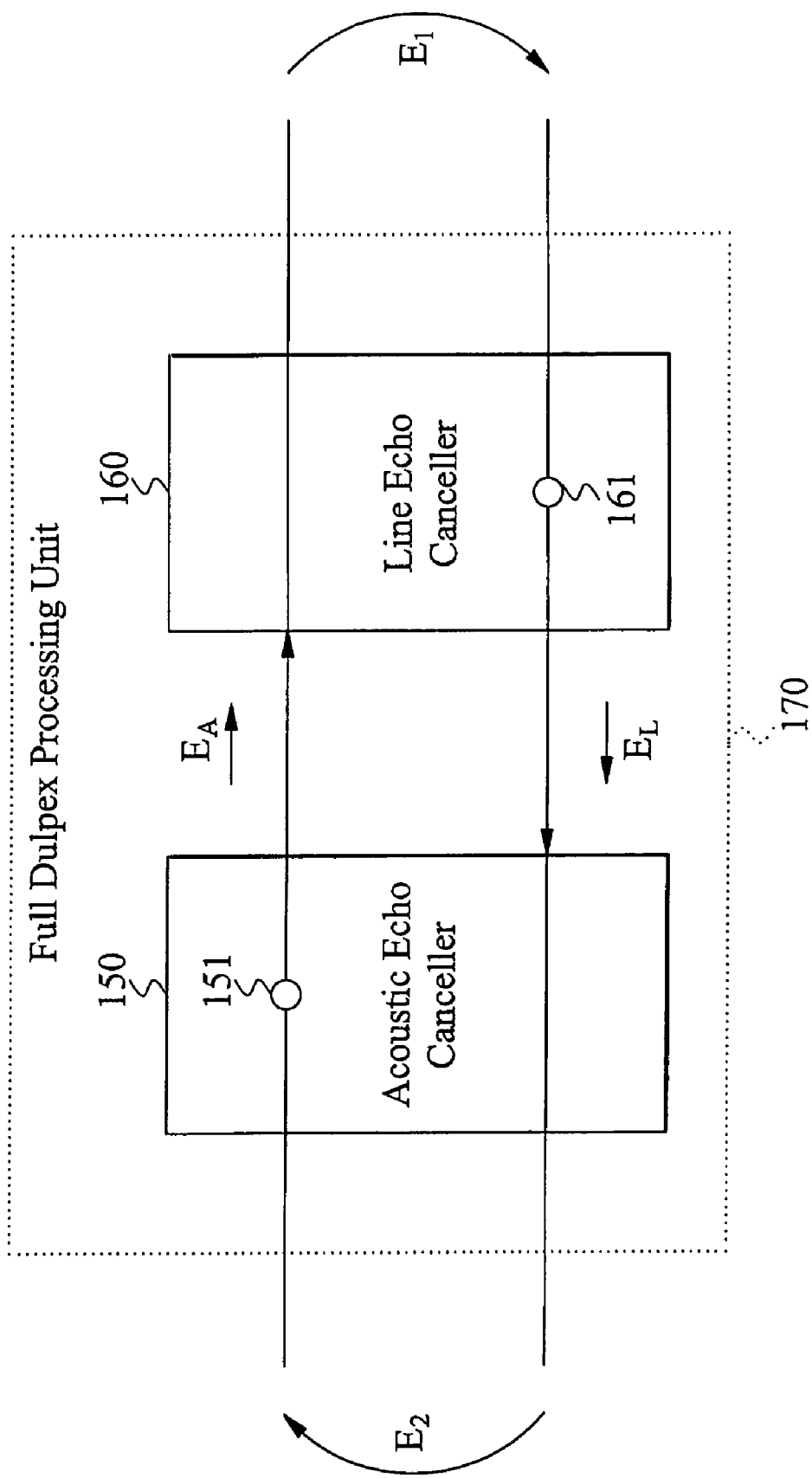
FIG. 4 shows a simplified block diagram of the full-duplex processing unit of the full-duplex speakerphone adapter.

FIG. 4 shows a simplified block diagram of the full-duplex processing unit 170 of the full-duplex speakerphone adapter 300. The line echo canceller 160 cancels the line echo signal $E_1$ caused by the telephone hybrid interface circuit 130 and the acoustic echo canceller 150 cancels the acoustic echo signal $E_2$ coupled from the loudspeaker 51 output to the microphone 50. The feedback loop in the hands-free speakerphone mode is a signal loop path formed by the residual acoustic echo signal $E_A$, the residual line echo signal $E_L$, the line echo signal $E_1$ and the acoustic echo signal $E_2$. Because the microphone 50 and the loudspeaker 51 are placed in the proximity of each other, when the microphone pre-amplifier 180 and the loudspeaker amplifier 181 provide sufficient gain for facilitating the hands-free speakerphone mode, the total feedback loop gain is likely to exceed the stability threshold and cause howling or singing. The feedback loop stability can be achieved by both the acoustic echo cancellation and the line echo cancellation working in conjunction with each other.

Both the acoustic echo canceller 150 and line echo canceller 160 have linear adaptive filters that adapt to the echo path impulse response such that, after adaptation, each will become effective in injecting attenuation against the echo signal at their respective echo removal node 151 and node 161. If the residual line echo signal $E_L$ after the line echo cancellation echo removal node 161 is small compared to that before entering node 161, signal attenuation is effectively injected in the feedback loop by the line echo canceller 160. Similarly, if the residual acoustic echo signal $E_A$ after the acoustic echo cancellation node 151 is small compared to that before entering node 151, signal attenuation is effectively injected in the feedback loop by the acoustic echo canceller 150. In this manner, the feedback loop stability is achieved by the sum of the feedback loop signal attenuation achieved by the acoustic echo cancellation and the line echo cancellation in the full duplex processing module 170.

While the invention has been described by way of example and in terms of preferred embodiment, it is to be understood that the invention is not limited to thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A telephone system, comprising:
    an analog telephone comprising an ordinary analog telephone subscriber circuit for transmitting and receiving analog signals and a handset for users; and
    a full-duplex speakerphone adapter coupled between the analog telephone and a central office, using a subscriber loop interface circuit through a first telephone line to couple to the ordinary analog telephone subscriber circuit of the analog telephone and using a telephone hybrid interface circuit through a second telephone line to couple to a wall jack to communicate with the central office,
    wherein the telephone signal processing unit comprises a full-duplex processing unit, a telephone control logic unit, a first line echo canceller, and a switch, and
    wherein the telephone signal processing unit only uses the first line echo canceller to attenuate the line echo generated at the subscriber loop interface circuit during an ordinary analog telephone mode.

2. The telephone system as claimed in claim 1, wherein the full-duplex speakerphone adapter is switched to a hands-free speakerphone mode or an ordinary analog telephone mode.

3. The telephone system as claimed in claim 1, wherein the full-duplex speakerphone adapter comprises a telephone signal processing unit for processing digital signals to remove line echo and acoustic echo.

4. The telephone system as claimed in claim 1, wherein the full-duplex processing unit comprises a second line echo canceller to remove the line echo from the telephone hybrid interface circuit and an acoustic echo canceller to remove the acoustic echo from a loop through a microphone and a loudspeaker.

5. The telephone system as claimed in claim 1, wherein the full-duplex processing unit removes the line echo and the acoustic echo to achieve feedback loop stability during a hands-free speakerphone mode.

6. The telephone system as claimed in claim 1, wherein the telephone control logic unit controls the telephone hybrid interface circuit to switch to the off-hook condition or the on-hook condition and controls the subscriber loop interface circuit to ring the analog telephone.

7. The telephone system as claimed in claim 1, wherein the telephone control logic unit switches the full-duplex speakerphone adapter to a hands-free speakerphone mode or an ordinary analog telephone mode.

8. A full-duplex speakerphone adapter, comprising:
    a subscriber loop interface circuit through a first telephone line coupled to an ordinary analog telephone subscriber circuit of an analog telephone;
    a telephone hybrid interface circuit through a second telephone line coupled to a wall jack to communicate with a central office; and
    a telephone signal processing unit for processing digital signals to remove line echo and acoustic echo,
    wherein the full-duplex speakerphone adapter is switched to a hands-free speakerphone mode or an ordinary analog telephone mode,
    wherein the telephone signal processing unit comprises a full-duplex processing unit, a telephone control logic unit, a first line echo canceller, and a switch, and
    wherein the telephone signal processing unit only uses the first line echo canceller to attenuate the line echo generated at the subscriber loop interface circuit during the ordinary analog telephone mode.

9. The full-duplex speakerphone adapter as claimed in claim 8, wherein the full-duplex processing unit comprises a second line echo canceller to remove the line echo from the telephone hybrid interface circuit and an acoustic echo canceller to remove the acoustic echo from a loop through a microphone and a loudspeaker.

10. The full-duplex speakerphone adapter as claimed in claim 8, wherein the full-duplex processing unit removes the line echo and the acoustic echo to achieve feedback loop stability during the hands-free speakerphone mode.

11. The full-duplex speakerphone adapter as claimed in claim 8, wherein the telephone control logic unit controls the telephone hybrid interface circuit to switch to the off-hook condition or the on-hook condition and controls the subscriber loop interface circuit to ring the analog telephone.

12. The full-duplex speakerphone adapter as claimed in claim 8, wherein the telephone control logic unit switches the full-duplex speakerphone adapter to a hands-free speakerphone mode or an ordinary analog telephone mode.

* * * * *